(12) United States Patent
Suzuki

(10) Patent No.: US 10,356,245 B2
(45) Date of Patent: Jul. 16, 2019

(54) VOICE RECOGNITION SYSTEM AND VOICE RECOGNITION METHOD

(71) Applicant: TOYOTA JIDOSHA KABUSHIKI KAISHA, Toyota-shi, Aichi-ken (JP)

(72) Inventor: Koichi Suzuki, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/002,732

(22) Filed: Jun. 7, 2018

(65) Prior Publication Data
US 2019/0028592 A1 Jan. 24, 2019

(30) Foreign Application Priority Data
Jul. 21, 2017 (JP) ................................. 2017-141765

(51) Int. Cl.
H04M 11/00 (2006.01)
H04M 3/58 (2006.01)
H04M 3/493 (2006.01)
G10L 17/22 (2013.01)
H04M 3/42 (2006.01)

(52) U.S. Cl.
CPC ............... *H04M 3/58* (2013.01); *G10L 17/22* (2013.01); *H04M 3/42221* (2013.01); *H04M 3/4936* (2013.01); *H04M 2201/39* (2013.01); *H04M 2201/40* (2013.01)

(58) Field of Classification Search
CPC .. H04M 3/58; H04M 3/42221; H04M 3/4936; G10L 17/22
See application file for complete search history.

(56) References Cited

U.S. PATENT DOCUMENTS

| | | | |
|---|---|---|---|
| 6,778,191 B2* | 8/2004 | Diederiks | G06F 3/04817 700/245 |
| 2007/0198272 A1* | 8/2007 | Horioka | G10L 15/22 704/275 |
| 2008/0154591 A1* | 6/2008 | Kujirai | G10L 15/22 704/231 |
| 2011/0153322 A1* | 6/2011 | Kwak | G10L 15/22 704/235 |
| 2014/0249826 A1* | 9/2014 | Nakano | G10L 13/027 704/275 |
| 2014/0297281 A1* | 10/2014 | Togawa | G10L 15/22 704/251 |
| 2018/0174582 A1* | 6/2018 | Fanty | G10L 15/22 |

FOREIGN PATENT DOCUMENTS

| | | |
|---|---|---|
| JP | 2001086243 A | 3/2001 |
| JP | 2011203349 A | 10/2011 |
| JP | 2015049337 A | 3/2015 |

* cited by examiner

*Primary Examiner* — Simon King
(74) *Attorney, Agent, or Firm* — Hunton Andrews Kurth LLP

(57) ABSTRACT

A voice recognition system includes a call connection control device that controls the call destination of a user, and a computer. The computer is configured to perform voice recognition of speech voice data of the user, determine an intention of a speech of the user based on a voice recognition result of the speech voice data, evaluate the reliability of a response generated by the computer for the user based on the determined intention of the speech of the user, and cause the call connection control device to switch the call destination of the user to an operator terminal in a case where the reliability of the response is equal to or less than a threshold value.

6 Claims, 8 Drawing Sheets

| INTENTION DETERMINATION DICTIONARY | | | |
|---|---|---|---|
| INTENTION OF USER SPEECH | PROCESSING FOR RESPONSE | RESPONSE | ... |
| FACILITY SEARCH | SEARCH USING RECOGNIZED FACILITY NAME | SEARCH RESULT RESPONSE USING VOICE | |
| FACILITY RESERVATION | -- | -- | |
| ⋮ | ⋮ | ⋮ | |

INTENTION DETERMINATION DICTIONARY

| INTENTION OF USER SPEECH | PROCESSING FOR RESPONSE | RESPONSE | ... |
|---|---|---|---|
| FACILITY SEARCH | SEARCH USING RECOGNIZED FACILITY NAME | SEARCH RESULT RESPONSE USING VOICE | |
| FACILITY RESERVATION | – | – | |
| ⋮ | ⋮ | ⋮ | |

VOICE RECOGNITION SYSTEM AND VOICE RECOGNITION METHOD

INCORPORATION BY REFERENCE

The disclosure of Japanese Patent Application No. 2017-141765 filed on Jul. 21, 2017 including the specification, drawings and abstract is incorporated herein by reference in its entirety.

BACKGROUND

1. Technical Field

The present disclosure relates to a voice recognition system and a voice recognition method.

2. Description of Related Art

In the related art, there is a telephone response system that, for example, in a case where a voice recognizer detects that the accuracy of a recognition result obtained by recognizing the voice of a customer is equal to or less than a threshold value, decides a recognition error and performs switching to an operator's response (refer to, for example, Japanese Unexamined Patent Application Publication No. 2015-49337 (JP 2015-49337 A)).

SUMMARY

However, in the telephone response system of the related art, even in a case where the voice recognizer detects that the accuracy of the recognition result obtained by recognizing the voice of the customer is not equal to or less than the threshold value, it is not always possible to make an appropriate answer for the customer. Therefore, there are cases where the telephone response system of the related art cannot perform quick switching to the operator's response.

The present disclosure provides a voice recognition system and a voice recognition method capable of performing quick switching to the operator's response.

A first aspect of the present disclosure relates to a voice recognition system. The voice recognition system includes a call connection control device and a computer. The call connection control device is configured to control a call destination of a user. The computer is configured to perform voice recognition of speech voice data of the user, determine an intention of a speech of the user based on a voice recognition result of the speech voice data, evaluate reliability of a response generated for the user based on the determined intention of the speech of the user, and cause the call connection control device to switch the call destination of the user to an operator terminal in a case where the reliability of the response is equal to or less than a threshold value.

According to the first aspect of the present disclosure, in a case where the reliability of the response for the intention of the speech of the user is equal to or less than the threshold value even though the intention of the speech of the user has been determined, it is possible to switch the call destination of the user to the operator terminal. Therefore, it is possible to provide a voice recognition system capable of performing quick switching to the operator's response.

In the voice recognition system according to the first aspect of the present disclosure, the computer may be configured to transmit history information, which includes the speech of the user and the response generated by the computer, to the operator terminal and display the history information on the operator terminal in a case where the call destination of the user is switched to the operator terminal.

According to the first aspect of the present disclosure, in a case where the call destination of the user is switched to the operator terminal, the history information including the speech of the user and the response can be displayed on the operator terminal. Accordingly, it is possible to make a smooth handover to the operator.

In the voice recognition system according to the first aspect of the present disclosure, the computer may be configured to switch the call destination of the user to the operator terminal in a case where the determined intention of the speech of the user is not registered as a user request for which generating a response for the user is allowed.

According to the first aspect of the present disclosure, in a case where the determined intention of the speech of the user is not registered as a user request for which generating a response for the user is allowed, it is possible to quickly switch the call destination of the user to the operator terminal. Therefore, it is possible to provide a voice recognition system capable of performing quick switching to the operator's response.

In the voice recognition system according to the first aspect of the present disclosure, the computer may be configured to evaluate the reliability of the response to be lower as the number of search result candidates or the number of times of re-search becomes larger in a case where the determined intention of the speech of the user is registered as a user request relevant to a search.

In the voice recognition system according to the first aspect of the present disclosure, in a case where the number of search result candidates or the number of times of re-search is large even though the determined intention of the speech of the user is registered as a user request relevant to the search, it is possible to quickly switch the call destination of the user to the operator terminal. Therefore, it is possible to provide a voice recognition system capable of performing quick switching to the operator's response.

In the voice recognition system according to the first aspect of the present disclosure, the computer may be configured to generate a response to be made for the user based on the determined intention of the speech of the user and perform voice synthesis of the response to be made for the user.

According to the first aspect of the present disclosure, it is possible to realize a voice recognition system configured to be able to generate a response to be made for the user based on the determined intention of the speech of the user and perform voice synthesis of the response. Therefore, until switching to the operator's response occurs, it is possible to perform voice synthesis of the response based on the determined intention of the speech of the user.

A second aspect of the present disclosure relates to a voice recognition method using a voice recognition system configured to perform voice recognition of speech voice data of a user and determine an intention of a speech of the user based on a voice recognition result of the speech voice data, a call connection control device configured to control a call destination of the user, and a computer. The voice recognition method includes evaluating reliability of a response generated by the computer for the user based on the intention of the speech of the user determined by the voice recognition system, and switching the call destination of the user to an operator terminal by controlling the call connection control device by the computer in a case where the reliability of the response is equal to or less than a threshold value.

According to the first aspect of the present disclosure, in a case where the reliability of the response for the intention of the speech of the user is equal to or less than the threshold value even though the intention of the speech of the user has been determined, it is possible to switch the call destination of the user to the operator terminal. Therefore, it is possible to provide a voice recognition method capable of performing quick switching to the operator's response.

According to the aspects of the present disclosure, it is possible to provide a voice recognition system and a voice recognition method capable of performing quick switching to the operator's response.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment to which a voice recognition system and a voice recognition method of the present disclosure are applied will be described.

Figure 1:
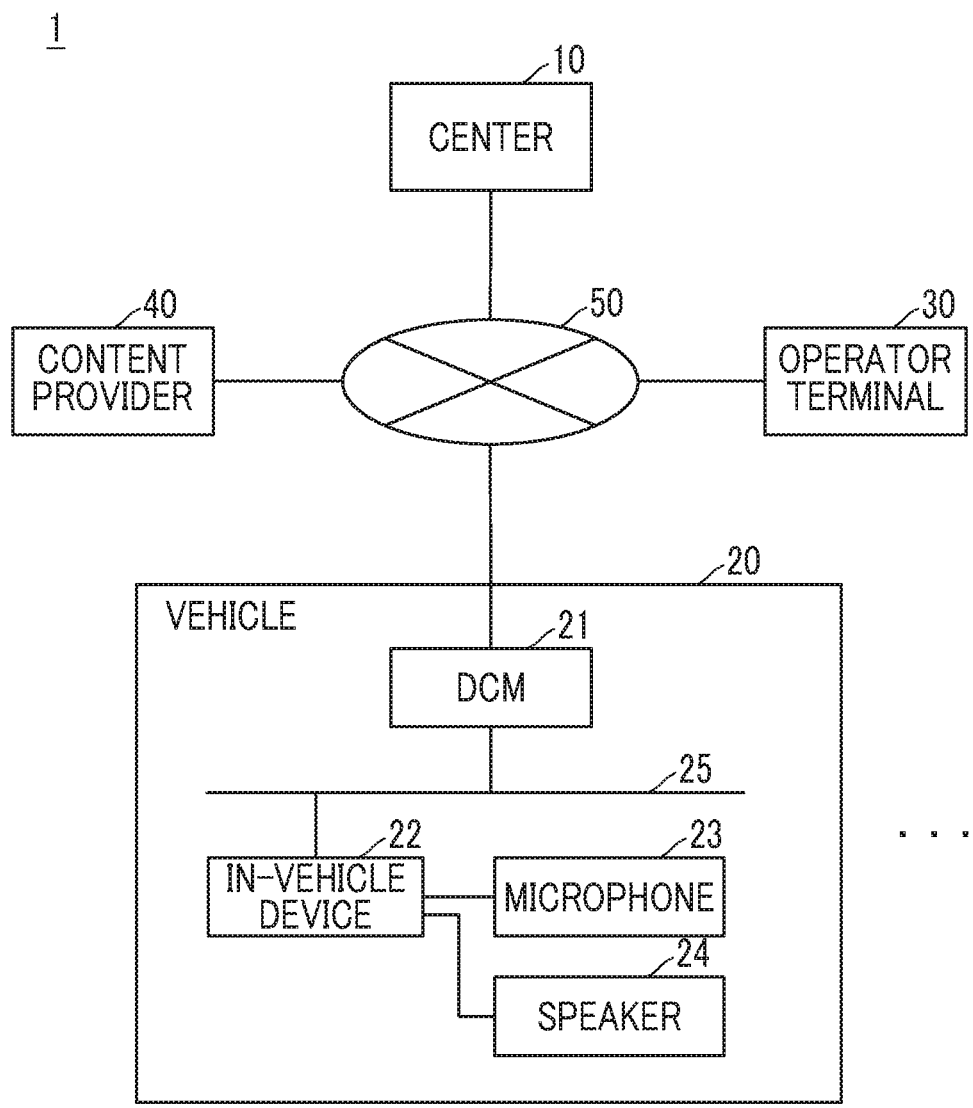
FIG. 1 is a block diagram of an example of a voice recognition system according to an embodiment of the present disclosure.

FIG. 1 is a block diagram of an example of a voice recognition system according to an embodiment of the present disclosure. A voice recognition system 1 includes a center 10, a vehicle 20, an operator terminal 30, and a content provider 40. A data communication module (DCM) 21, an in-vehicle device 22, a microphone 23, and a speaker 24 are mounted in the vehicle 20. In FIG. 1, an example is shown in which one vehicle 20, one operator terminal 30, and one content provider 40 are provided. However, one or more vehicles 20, one or more operator terminals 30, and one or more content providers 40 may be provided.

The DCM 21 and the in-vehicle device 22 are communicably connected to each other through a controller area network (CAN) 25 as an example. The microphone 23 and the speaker 24 are directly connected to the in-vehicle device 22 to receive and output voice data. The center 10, the DCM 21 mounted in the vehicle 20, and the operator terminal 30 and the content provider 40 are connected to each other through a network 50, such as a mobile communication network or an Internet network.

The center 10 is configured to include one or more computers (information processing apparatuses). The center 10 collects speech voice data of the user from the in-vehicle device 22 of each vehicle 20, determines the intention of the speech of the user, and provides conversation services through voice agents or conversation services through operators.

The in-vehicle device 22 mounted in the vehicle 20 may include a navigation system, or may be a navigation electronic control unit (ECU). The in-vehicle device 22 communicates with the center 10 or the operator terminal 30 through the CAN 25, the DCM 21, and the network 50. The DCM 21 is an example of a communication unit or a wireless communication device mounted in the vehicle 20. For example, the DCM 21 performs wireless communication through a communication line, such as 3rd_generation (3G), long_term_evolution (LTE), 4th_generation (4G), or 5th_generation (5G).

The operator terminal 30 is a terminal device operated by the operator, and is configured by a computer. The content provider 40 is configured by one or more computers that provide a search function and the like to the center 10.

The CAN 25 of the vehicle 20 is an example. Instead of the CAN 25, a bus other than the CAN 25, such as a bus adopting the Ethernet (registered trademark) protocol may be used. In addition to the above, various devices and equipment are mounted in the vehicle 20. However, components needed to describe the embodiment of the present disclosure are selectively shown.

Figure 2:
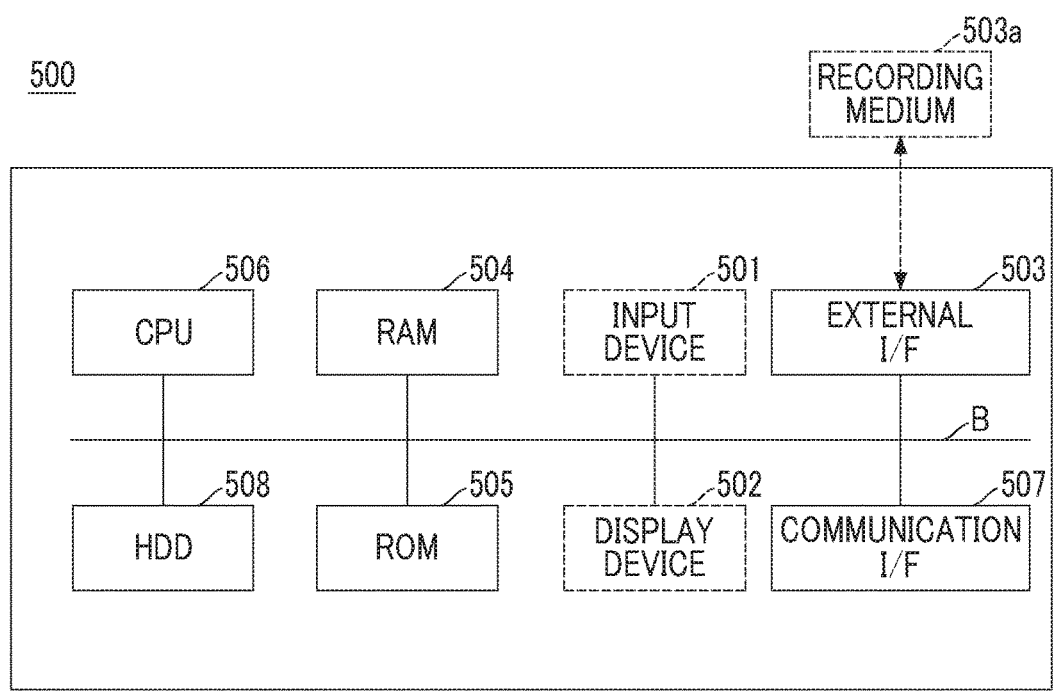
FIG. 2 is a block diagram showing the hardware configuration of an example of a computer.

A computer configuring each of the center 10, the in-vehicle device 22 mounted in the vehicle 20, the operator terminal 30, and the content provider 40 shown in FIG. 1 is realized, for example, by the hardware configuration shown in FIG. 2. FIG. 2 is a block diagram showing the hardware configuration of an example of a computer.

A computer 500 shown in FIG. 2 includes an input device 501, a display device 502, an external interface (I/F) 503, a random access memory (RAM) 504, a read only memory (ROM) 505, a CPU 506, a communication I/F 507, a hard disk drive (HDD) 508, and the like, and these are connected to each other by a bus B. The input device 501 and the display device 502 may be connected to each other as needed.

The input device 501 is a keyboard, a mouse, a touch panel, or the like, and is used by the user to input operation signals. The display device 502 is a display or the like, and displays the processing result of the computer 500. The communication I/F 507 is an interface for connecting the computer 500 to the network. The HDD 508 is an example of a nonvolatile storage device that stores programs or data.

The external I/F 503 is an interface with an external device. The computer 500 can perform at least one of reading or writing of a recording medium 503a, such as a secure digital (SD) memory card, through the external I/F 503. The ROM 505 is an example of a nonvolatile semiconductor memory (storage device) in which programs or data is stored. The RAM 504 is an example of a volatile semiconductor memory (storage device) that temporarily stores programs or data.

The CPU 506 is an arithmetic unit that realizes control or functions of the entire computer 500 by reading a program or data from a storage device, such as the ROM 505 or the HDD 508, onto the RAM 504 and performing the processing. The center 10, the in-vehicle device 22, the operator terminal 30, and the content provider 40 shown in FIG. 1 can realize various kinds of processing to be described later, for example, by the hardware configuration of the computer 500 shown in FIG. 2.

The computer 500 that realizes the in-vehicle device 22 may be configured to further have a global positioning system (GPS) receiver. The GPS receiver receives a GPS signal transmitted from a GPS Satellite, and measures the current position of the vehicle 20 based on the GPS signal.

Figure 3:
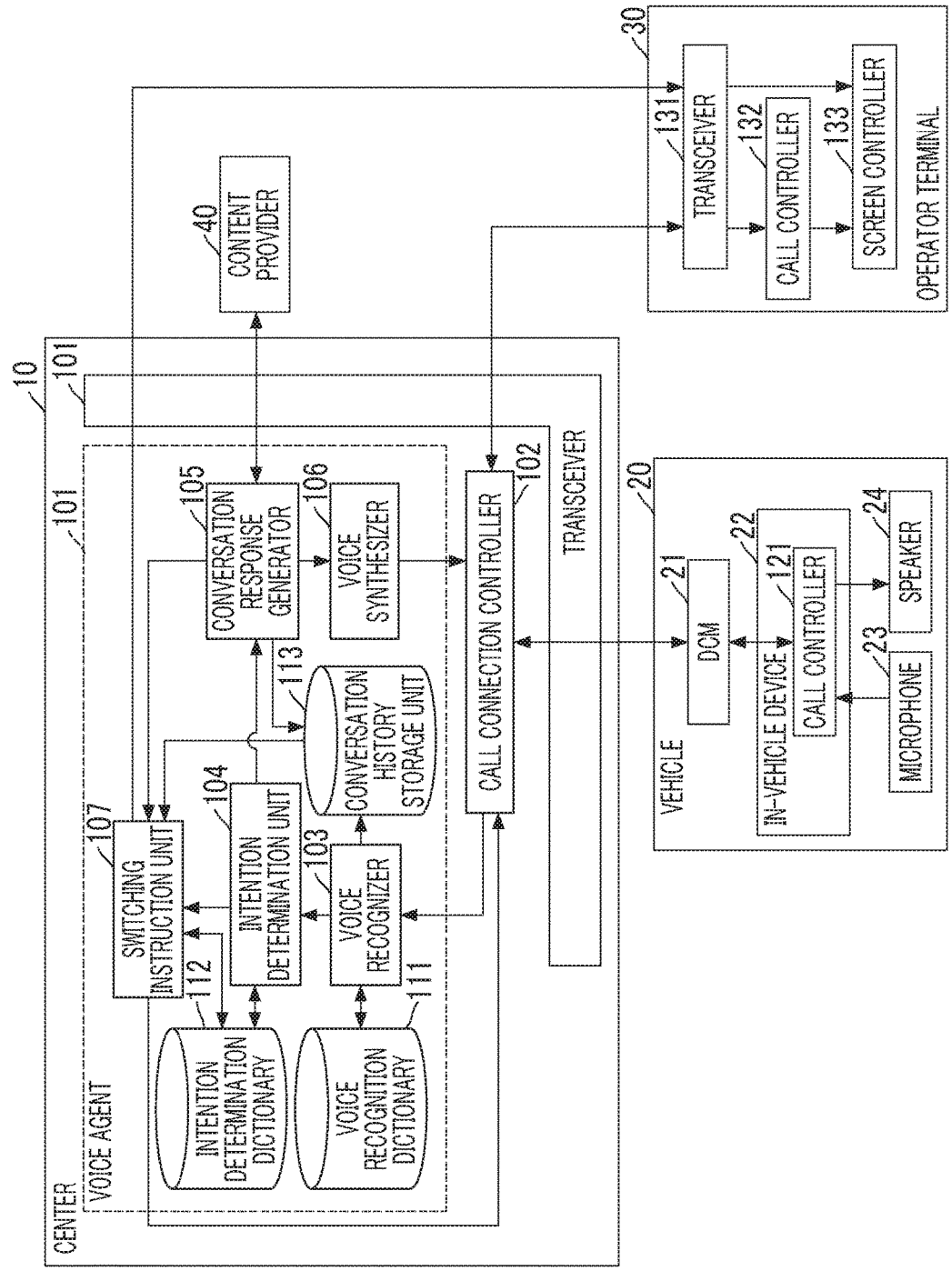
FIG. 3 is a functional block diagram of an example of the voice recognition system according to the embodiment of the present disclosure.

FIG. 3 is a functional block diagram of an example of the voice recognition system according to the embodiment of the present disclosure. In FIG. 3, the center 10 has a transceiver 101, a call connection controller 102, a voice recognizer 103, an intention determination unit 104, a conversation response generator 105, a voice synthesizer 106, a switching instruction unit 107, a voice recognition dictionary 111, an intention determination dictionary 112, and a conversation history storage unit 113. The voice recognition dictionary 111, the intention determination dictionary 112, and the conversation history storage unit 113 may be realized by the storage device of the center 10, or may be realized by a storage device connected with the center 10 through the network.

In FIG. 3, the voice recognizer 103, the intention determination unit 104, the conversation response generator 105, the voice synthesizer 106, the switching instruction unit 107, the voice recognition dictionary 111, the intention determination dictionary 112, and the conversation history storage unit 113 realizes a voice agent 100. The voice agent 100 shown in FIG. 3 is configured to have the voice recognition dictionary 111, the intention determination dictionary 112, and the conversation history storage unit 113. However, the voice recognition dictionary 111, the intention determination dictionary 112, and the conversation history storage unit 113 outside the voice agent 100 may be used.

The transceiver 101 controls communication with the vehicle 20, the operator terminal 30, and the content provider 40. The call connection controller 102 performs call connection control to switch the call destination of the user of the vehicle 20 from the voice agent 100 to the operator terminal 30 using a session initiation protocol (SIP). The SIP is an example of a call connection control protocol for calls through an Internet Protocol (IP) network.

The call connection controller 102 transmits the speech voice data of the user received from the vehicle 20 to the voice agent 100 or the operator terminal 30 that is the call destination. For example, a voice over Internet protocol (VoIP) is used to exchange speech voice data using the network 50.

The voice agent 100 of the voice recognizer 103 recognizes the speech voice data of the user using the voice recognition dictionary 111, and outputs the speech text, which is a voice recognition result, to the intention determination unit 104 and the conversation history storage unit 113. Since the voice recognition processing using the voice recognition dictionary 111 is a known technique, the explanation thereof will be omitted.

The intention determination unit 104 performs morphological analysis of the input speech text to determine the context (for example, what is the question about?). In addition, the intention determination unit 104 determines the intention of the speech of the user, such as the content of a question, using the determined context or the intention determination dictionary 112. The intention determination unit 104 searches for a response to the speech of the user based on the determined intention (user request) of the speech of the user. The intention determination unit 104 outputs the intention determination result and the response search result to the switching instruction unit 107 and the conversation response generator 105.

The conversation response generator 105 generates conversation response data, as will be described later, based on the input intention determination result and response search result, and outputs the conversation response data to the voice synthesizer 106. As needed, the conversation response generator 105 uses a function of a content provider 40, such as a search function, to generate conversation response data. In addition, the conversation response generator 105 outputs the result of the processing for generating conversation response data (for example, the number of candidates searched for by using the search function) to the switching instruction unit 107. The voice synthesizer 106 synthesizes the conversation response voice data from the input conversation response data, and answers to the vehicle 20.

As described above, the conversation service by the voice agent 100 is realized in a case where the call connection controller 102 distributes the speech voice data of the user received from the vehicle 20 to the voice agent 100 and the voice recognizer 103, the intention determination unit 104, the conversation response generator 105, and the voice synthesizer 106 process the speech voice data in this order.

The intention determination result and the response search result from the intention determination unit 104 are input to the switching instruction unit 107 of the voice agent 100. In addition, a result of the processing for generating the conversation response data from the conversation response generator 105 (for example, the number of candidates searched for by using the search function) is input to the switching instruction unit 107.

Based on the input intention determination result, response search result, and result of the processing for generating the conversation response data, the switching instruction unit 107 evaluates the reliability of the response by the voice agent 100 using the intention determination dictionary 112. For example, even in a case where the intention determination is performed correctly, in the case of a user request that cannot be executed by the voice agent 100, such as reservation of a facility, the switching instruction unit 107 evaluates the reliability to be low. In addition, even in the case of a user request that can be executed by the voice agent 100, such as search of a facility, in a case where the number of candidates searched for by using the search function is relatively large or the number of times of re-search is large, the switching instruction unit 107 evaluates the reliability to be low.

The switching instruction unit 107 sets the reliability of a response, for which switching from the conversation service by the voice agent 100 to the conversation service (operator conversation service) by the operator is better, as a threshold value. In a case where the reliability of the response is equal to or less than the threshold value, the switching instruction unit 107 instructs the call connection controller 102 to switch the call destination of the user of the vehicle 20 from the voice agent 100 to the operator terminal 30 (for example, REFER request of SIP).

As described above, the conversation service by the operator is realized in a case where the switching instruction unit 107 instructs the call connection controller 102 to distribute the speech voice data of the user received from the vehicle 20 to the operator terminal 30. In addition, the switching instruction unit 107 reads the conversation history from the conversation history storage unit 113, and transmits the conversation history or the summary of the conversation history to the operator terminal 30.

In FIG. 3, the in-vehicle device 22 of the vehicle 20 has a call controller 121. The call controller 121 converts the speech of the user input from the microphone 23 into speech voice data, and transmits the speech voice data to the call connection controller 102 of the center 10. In addition, the call controller 121 outputs the conversation response voice data from the operator or the conversation response voice data, which is received from the call connection controller 102, through the speaker.

A transceiver 131 of the operator terminal 30 controls communication with the center 10. A call controller 132 converts the operator's speech input from the microphone into conversation response voice data, and transmits the conversation response voice data to the call connection controller 102 of the center 10. In addition, the call controller 132 outputs the speech voice data received from the call connection controller 102 through the speaker. A screen controller 133 displays an operator screen on the operator terminal 30.

On the operator screen, the conversation history of the voice agent 100 or the summary of the conversation history is displayed as information. As described above, the operator can check the user request and the response of the voice agent 100 to the user request on the screen to make a smooth handover.

Figure 4:
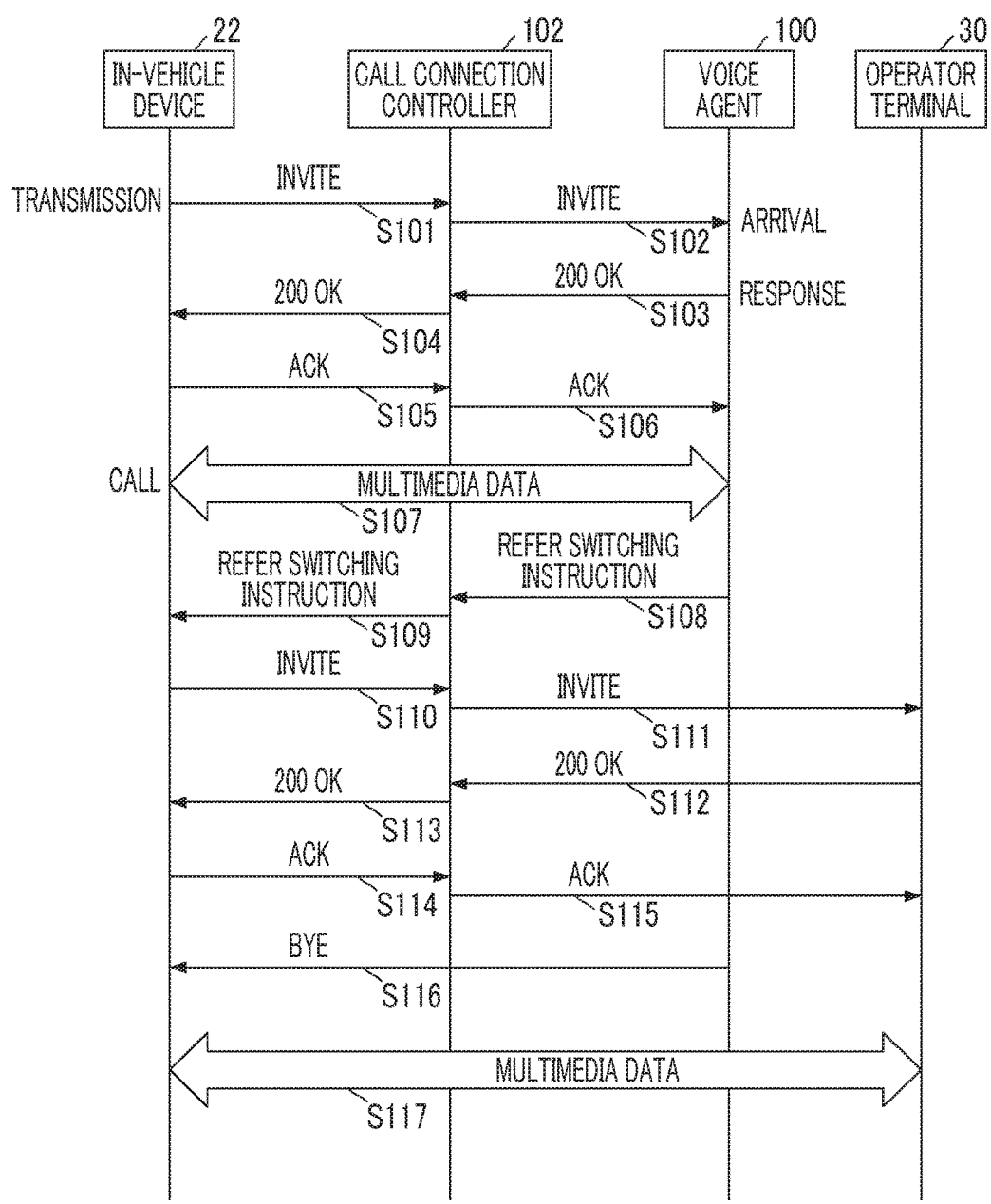
FIG. 4 is a sequence diagram of an example of a call destination switching process using an SIP.

The call connection controller 102 performs processing for switching the call destination of the user from the voice agent 100 to the operator terminal 30, for example, in the procedure of the sequence diagram of FIG. 4. FIG. 4 is a sequence diagram of an example of the call destination switching process using the SIP.

In a case where there is a speech from the user, the in-vehicle device 22 transmits an INVITE request to the call connection controller 102 of the center 10 in step S101. In step S102, the call connection controller 102 transmits the INVITE request to the IP address corresponding to the destination session initiation protocol uniform resource identifier (SIPURI) in the INVITE request using the pre-existing registration information so as to arrive at the voice agent 100.

In steps S103 and S104, the voice agent 100 returns a "200 OK" response for connection answer to the in-vehicle device 22 of the transmission source. In steps S105 and S106, the in-vehicle device 22 of the transmission source returns an acknowledge character (ACK) request to the voice agent 100 of the transmission destination as a confirmation that the "200 OK" response has been received.

In step S107, the in-vehicle device 22 and the voice agent 100 transmit and receive multimedia data, such as voice data, to and from a user agent (UA) based on session description protocol (SDP) information exchanged in the body part of the "200 OK" response or the INVITE request.

In step S108, in a case where the reliability of the response is equal to or less than the threshold value, the switching instruction unit 107 of the voice agent 100 instructs the call connection controller 102 to switch the call destination of the user of the vehicle 20 from the voice agent 100 to the operator terminal 30. In step S109, the call connection controller 102 instructs the in-vehicle device 22 to switch the call destination of the user from the voice agent 100 to the operator terminal 30.

In steps S110 to S115, the in-vehicle device 22 switches the call destination of the user from the voice agent 100 to the operator terminal 30 in the same procedure as in steps S101 to S106. In step S116, the voice agent 100 disconnects the call with the in-vehicle device 22 by transmitting a BYE request to the in-vehicle device 22. Then, the in-vehicle device 22 and the operator terminal 30 transmit and receive multimedia data, such as voice data.

Figure 5:
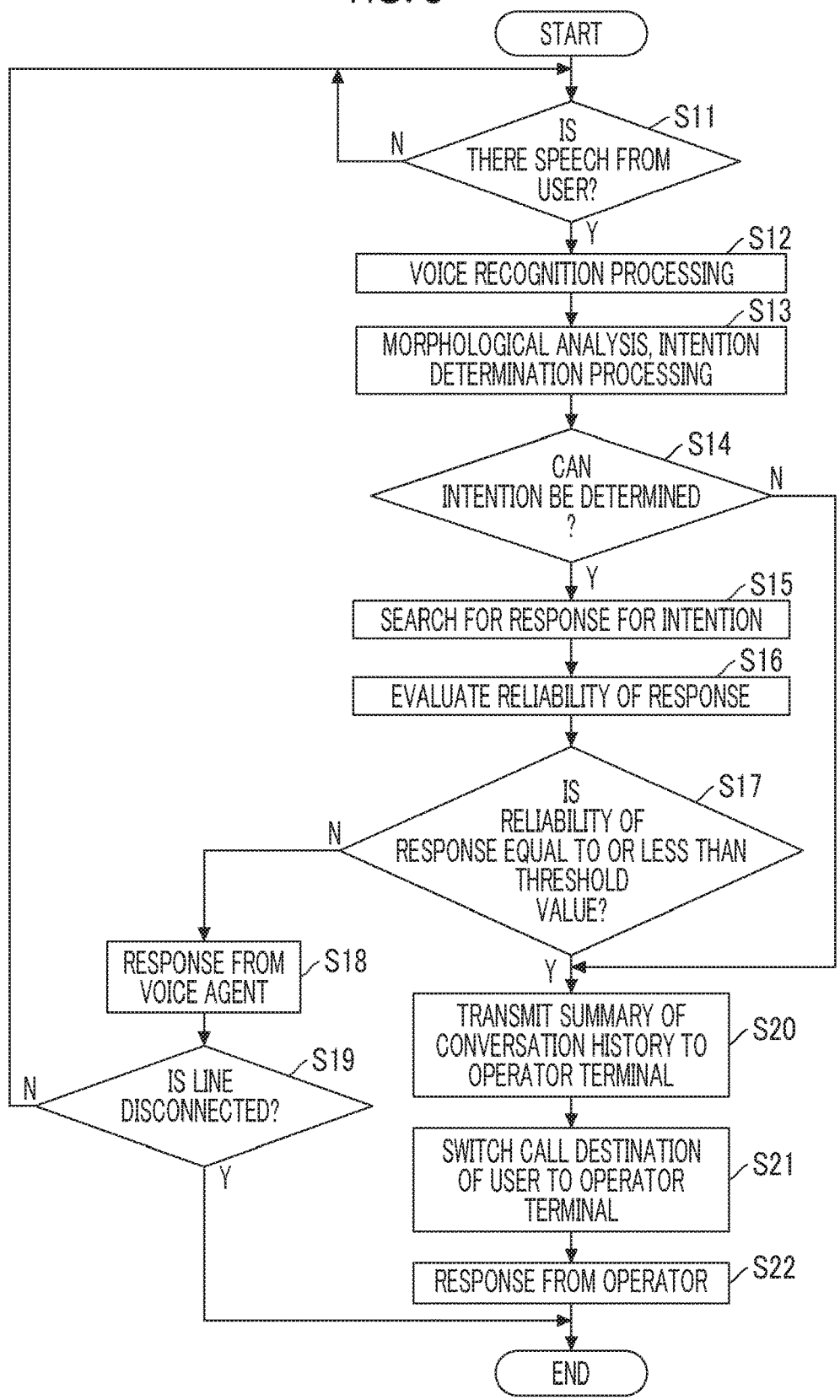
FIG. 5 is a flowchart of an example of the process executed by the voice recognition system according to the embodiment of the present disclosure.

The voice recognition system 1 performs processing in the procedure shown in FIG. 5, for example. FIG. 5 is a flowchart of an example of the process executed by the voice recognition system according to the embodiment of the present disclosure. In a case where speech voice data from the user is received, the process proceeds from step S11 to step S12, in which the voice recognizer 103 of the center 10 recognizes the speech voice data of the user using the voice recognition dictionary 111.

In step S13, the intention determination unit 104 performs morphological analysis of the speech text, which is a voice recognition result, and performs intention determination processing for determining the intention of the speech of the user. In the intention determination processing, the context (for example, what is the question about?) of the speech text that is a voice recognition result, is determined.

In step S14, the intention determination unit 104 decides whether or not the intention of the speech of the user, such as the content of a question, can be determined by the determined context or the intention determination dictionary 112. For example, in a case where the context of the speech text is decided to be "look for XXXX facility", the intention determination unit 104 decides that the intention can be determined since a response to the intention can be searched for (information of the place of the XXXX facility can be searched for). In addition, even in a case where the context of the speech text is decided to be "set the XXXX facility as a destination", the intention determination unit 104 decides that the intention can be determined since a response to the intention can be searched for (XXXX facility can be set as a destination).

In a case where the speech text is decided to be "aiueo", the intention determination unit 104 decides that the intention cannot be determined since the context cannot be determined and accordingly a response to the intention cannot be searched for. In a case where the speech text is solely "XXXX facility", there is no context but the speech text can be determined as a place. Accordingly, the intention determination unit 104 decides that the intention can be determined since a response to the intention can be searched for (information of the place of the XXXX facility can be searched for). In a case where the speech text is "weather of XXXX facility", the intention determination unit 104 decides that the intention can be determined since the speech text can be read as "weather in the vicinity of facility" even though the speech text does not match the context. In a case where the speech text is "XXXX facility, weather", the intention determination unit 104 decides that the intention cannot be determined since a response to the intention cannot be searched for.

Figures 6, 7:
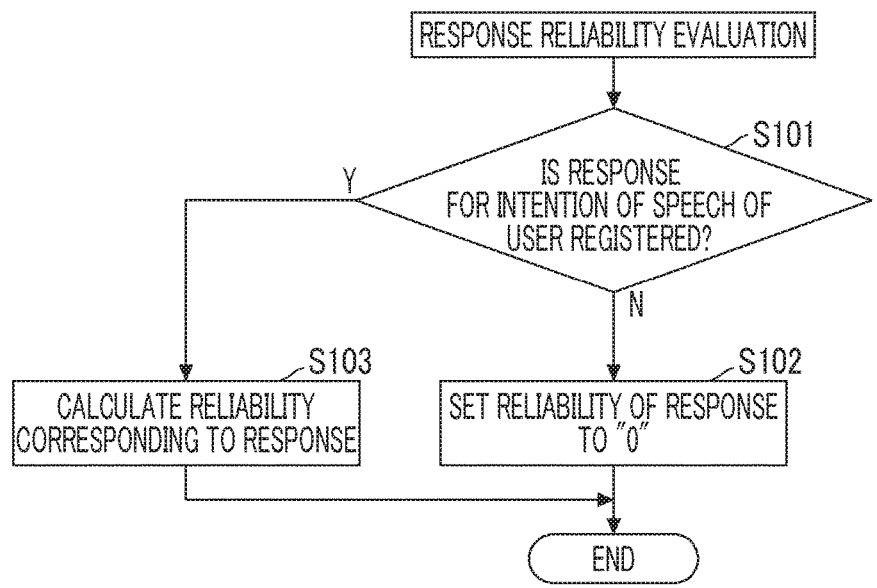
FIG. 6 is a table of an example of an intention determination dictionary.
FIG. 7 is a flowchart of an example of a response reliability evaluation process.

In a case where the intention determination unit 104 decides that the intention of the speech of the user can be determined, the intention determination unit 104 proceeds to step S15 to search for a response to the speech of the user based on the determined intention (user request) of the speech of the user, for example, using the intention determination dictionary 112 shown in FIG. 6. FIG. 6 is a table of an example of an intention determination dictionary. The intention determination dictionary shown in FIG. 6 has an intention of user speech, processing for response, and a response as items. The item "intention of user speech" indicates the intention (user request) of the speech of the user. The item "processing for response" indicates processing for a response to the intention (user request) of the speech of the user. The item "response" indicates a response to the speech of the user.

For example, in the example shown in FIG. 6, in a case where the intention of the user speech is "search for facility", a response indicating that a search is performed with the recognized facility name and the search result is output by voice is set. In addition, in a case where the intention of the user speech is "facility reservation", "-" indicating "not set" is set in the item "processing for response" and the item "response" since this is a user request that cannot be executed by the voice agent 100.

In step S16, the switching instruction unit 107 evaluates the reliability of the response by the voice agent 100 in the procedure of the flowchart of FIG. 7. FIG. 7 is a flowchart of an example of a response reliability evaluation process.

In step S101, the switching instruction unit 107 decides whether or not a response to the intention of the speech of the user is registered in the intention determination dictionary 112 shown in FIG. 6. In a case where no response to the intention of the speech of the user is registered, the switching instruction unit 107 proceeds to step S102 to evaluate the reliability of the response to, for example, "0". The evaluation "0" of the reliability of the response in step S102 is an example, and may be a value smaller than the threshold value in step S17. In a case where a response to the intention of the speech of the user is registered, the switching instruction unit 107 proceeds to step S103 to calculate the reliability corresponding to the response.

For example, in a case where the speech text is a part of the name of a famous leisure land "YYY", the number of candidates, such as "YYY land" and "YYY store" in "search for place information" is large. Therefore, the evaluation of the reliability of the response is set to be low. However, for example, it is desirable to set the evaluation of the reliability of the response so as not to be smaller than the threshold value in the first search. As described above, in a case where the evaluation of the reliability of the response is set so as not to be smaller than the threshold value in the first search, the voice agent 100 can make a response for facility reconfirmation, such as "YYY land? YYY store? Please speak with the full name in the case of other facilities". Then, by setting the evaluation of the reliability of the response to a value smaller than the threshold value in the second and subsequent re-searches, the switching instruction unit 107 can allow the voice agent 100 to reconfirm the facility at least once.

Returning to step S17 in FIG. 5, the switching instruction unit 107 decides whether or not the reliability of the response evaluated in step S16 is equal to or less than the threshold value. In a case where the reliability of the response evaluated in step S16 is equal to or less than the threshold value, the switching instruction unit 107 decides that switching from the conversation service by the voice agent 100 to the conversation service by the operator is not needed, and performs processing for making a response to the voice agent 100 in step S18. The voice agent 100 repeats the processing of the flowchart of FIG. 5 until the line is disconnected or the conversation service by the voice agent 100 is switched to the conversation service by the operator.

In a case where the reliability of the response evaluated in step S16 is equal to or less than the threshold value in step S17, the switching instruction unit 107 proceeds to step S20 to read the history of a conversation between the voice agent 100 and the user, which is stored in the conversation history storage unit 113, and transmit the summary of the conversation history to the operator terminal 30. In step S21, in a case where the reliability of the response is equal to or less than the threshold value, the switching instruction unit 107 instructs the call connection controller 102 to switch the call destination of the user of the vehicle 20 from the voice agent 100 to the operator terminal 30. The call connection controller 102 switches the call destination of the user from the voice agent 100 to the operator terminal 30.

Figure 8:
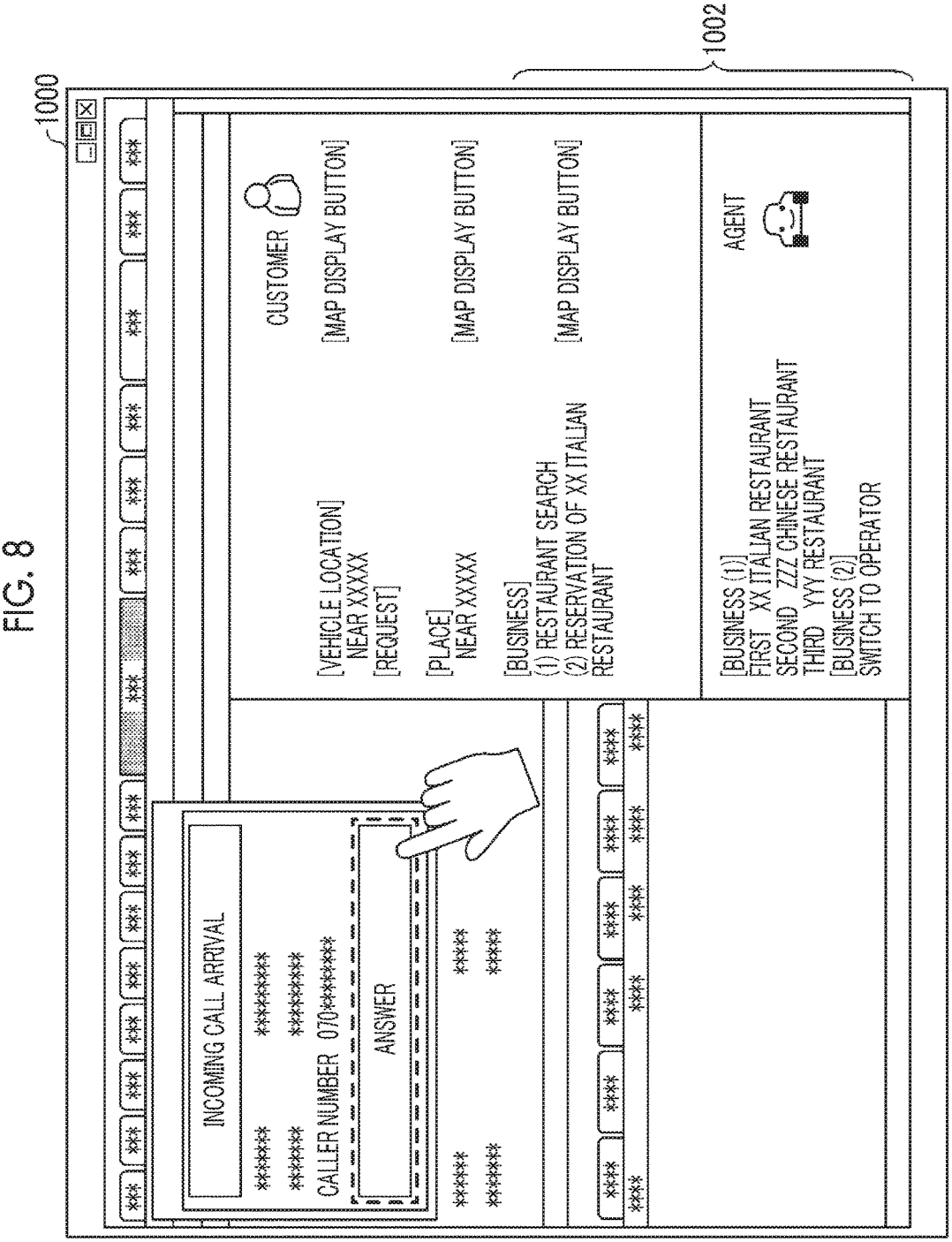
FIG. 8 is an image diagram of an example of an operator screen.

In step S22, the operator terminal 30 displays, for example, an operator screen 1000 shown in FIG. 8. FIG. 8 is an image diagram of an example of the operator screen. On the operator screen 1000 shown in FIG. 8, a summary 1002 of the history of a conversation with a user is displayed. By referring to the operator screen 1000, the operator can easily grasp the content of the conversation between the voice agent 100 and the user. Therefore, it is possible to make a smooth handover.

For example, it is desirable to display the user request and the response of the voice agent 100 to the user request on the operator screen 1000 so as to be associated with each other. For example, the operator screen 1000 shown in FIG. 8 is an example of the screen in a case where the content of a conversation between the voice agent 100 and the user is that shown in FIG. 9.

Figure 9:
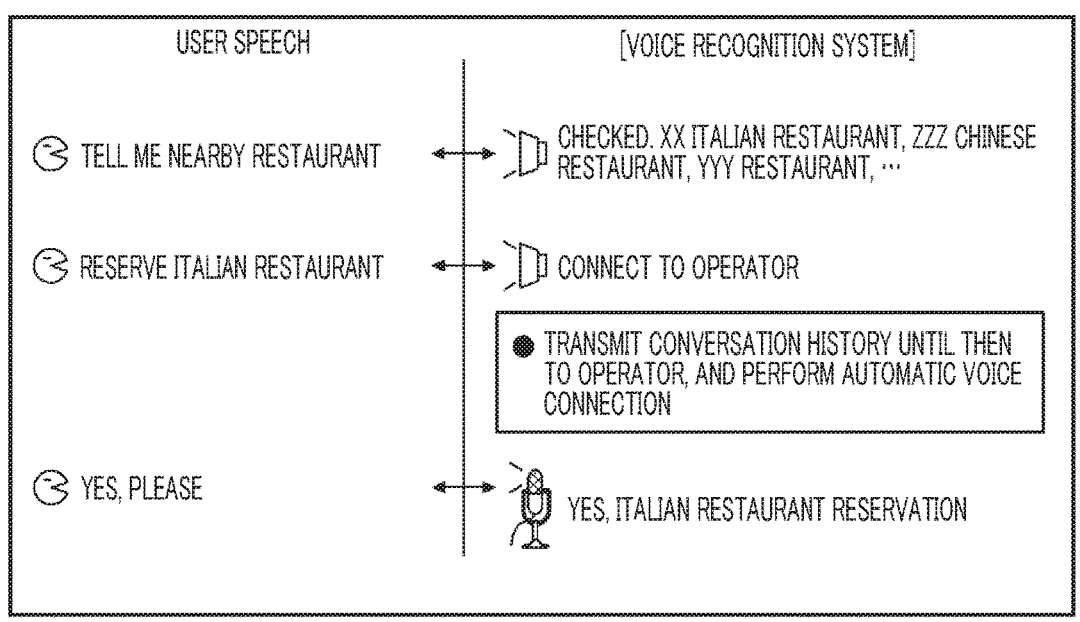
FIG. 9 is an explanatory diagram showing an example of the content of a conversation between a voice agent or an operator and a user.

FIG. 9 is an explanatory diagram showing an example of the content of a conversation between a voice agent or an operator and a user. In FIG. 9, the conversation service by the voice agent 100 is switched to the conversation service by the operator by a user request "reservation for Italian restaurant". For the user's speech "tell me a nearby restaurant", the voice agent 100 makes a response "I checked. Italian restaurant XX, Chinese restaurant ZZZ, YYY restaurant, . . . ".

For the user's speech "reserve Italian restaurant", the voice agent 100 makes a response "connect to the operator" and automatically switches the call destination of the user to the operator terminal 30. On the operator screen 1000 shown in FIG. 8, the summary 1002 of the conversation history shown in FIG. 8 is displayed in the case of the content of the conversation shown in FIG. 9.

According to the voice recognition system 1 according to the embodiment of the present disclosure, the voice agent 100 can be used for primary reception of a user request. Thereafter, in a case where a user request that is difficult to appropriately handle by the voice agent 100, such as reservation of a facility, is received, the reliability of the response by the voice agent 100 is equal to or less than the threshold value. Therefore, according to the voice recognition system 1 according to the embodiment of the present disclosure, in a case where a user request that is difficult to appropriately handle by the voice agent 100 is received, the conversation service by the voice agent 100 can be automatically switched to the conversation service by the operator.

An applicable embodiment of the present disclosure is not limited to the embodiment specifically disclosed, and various modifications or changes can be made without departing from the scope of the claims. For example, although an example in which the user has a conversation with the voice agent 100 or the operator using the in-vehicle device 22 is shown in the voice recognition system 1 according to the embodiment of the present disclosure, the user may have a conversation with the voice agent 100 or the operator using a mobile terminal, such as a smartphone. In addition, processes such as voice recognition, morphological analysis, intention determination, and evaluation of responses to the intention, which are performed by the center 10 of the voice recognition system 1 according to the embodiment of the present disclosure, may be performed outside the center 10, for example, by the in-vehicle device 22.

What is claimed is:

1. A voice recognition system comprising:
   a call connection control device configured to control a call destination of a user; and
   a computer configured to
   perform voice recognition of speech voice data of the user,
   determine an intention of a speech of the user based on a voice recognition result of the speech voice data,
   evaluate reliability of a response generated for the user based on the determined intention of the speech of the user, and
   cause the call connection control device to switch the call destination of the user to an operator terminal in a case where the reliability of the response is equal to or less than a threshold value.

2. The voice recognition system according to claim 1, wherein the computer is configured to transmit history information, which includes the speech of the user and the response generated by the computer, to the operator terminal and display the history information on the operator terminal in a case where the call destination of the user is switched to the operator terminal.

3. The voice recognition system according to claim 1, wherein the computer is configured to switch the call destination of the user to the operator terminal in a case where the determined intention of the speech of the user is not registered as a user request for which generating a response for the user is allowed.

4. The voice recognition system according to claim 1, wherein the computer is configured to evaluate the reliability of the response to be lower as the number of search result candidates or the number of times of re-search becomes larger in a case where the determined intention of the speech of the user is registered as a user request relevant to a search.

5. The voice recognition system according to claim 1, wherein the computer is configured to generate a response to be made for the user based on the determined intention of the speech of the user and perform voice synthesis of the response to be made for the user.

6. A voice recognition method using a voice recognition system configured to perform voice recognition of speech voice data of a user and determine an intention of a speech of the user based on a voice recognition result of the speech voice data, a call connection control device configured to control a call destination of the user, and a computer, the voice recognition method comprising:
   evaluating reliability of a response generated by the computer for the user based on the intention of the speech of the user determined by the voice recognition system; and
   switching the call destination of the user to an operator terminal by controlling the call connection control device by the computer in a case where the reliability of the response is equal to or less than a threshold value.

* * * * *